US009319666B1

(12) United States Patent
Lisin

(10) Patent No.: US 9,319,666 B1
(45) Date of Patent: Apr. 19, 2016

(54) DETECTING CONTROL POINTS FOR CAMERA CALIBRATION

(71) Applicant: The MathWorks, Inc., Natick, MA (US)

(72) Inventor: Dimitri Lisin, Shrewsbury, MA (US)

(73) Assignee: The MathWorks, Inc., Natick, MA (US)

( * ) Notice: Subject to any disclaimer, the term of this patent is extended or adjusted under 35 U.S.C. 154(b) by 8 days.

(21) Appl. No.: 13/908,565

(22) Filed: Jun. 3, 2013

(51) Int. Cl.
*H04N 17/00* (2006.01)
*H04N 17/02* (2006.01)

(52) U.S. Cl.
CPC ............. *H04N 17/002* (2013.01); *H04N 17/00* (2013.01)

(58) Field of Classification Search
USPC ......................................... 348/180, 187, 189
See application file for complete search history.

(56) References Cited

U.S. PATENT DOCUMENTS

| 8,223,193 B2* | 7/2012 | Zhao et al. ...................... 348/45 |
| 2009/0201376 A1* | 8/2009 | Bauer et al. .................... 348/187 |
| 2011/0055729 A1* | 3/2011 | Mason .................. G06F 3/0425 715/753 |
| 2011/0292219 A1* | 12/2011 | Chang et al. ................... 348/182 |
| 2012/0069193 A1* | 3/2012 | Ramegowda et al. ........ 348/164 |
| 2014/0253738 A1* | 9/2014 | Mullis ............................. 348/187 |
| 2014/0285676 A1* | 9/2014 | Barreto et al. ................. 348/187 |
| 2014/0333729 A1* | 11/2014 | Pflug .............................. 348/47 |

FOREIGN PATENT DOCUMENTS

KR 2013064167 A * 12/2011

OTHER PUBLICATIONS

"Automatic Camera and Range Sensor Calibration using a Single Shot," 2012 IEEE International Conference on Robotics and Automation, May 14-18, 2012, 8 pages.*
Bouguet, Jean-Yves, "Camera Calibration Toolbox for Matlab," Oct. 15, 2004, 4 pages—http://www.vision.caltech.edu/bouguetj/calib_doc/.
Bradski, Gary et al., "Learning OpenCV," O'Reilly, Sep. 2008, 571 pages.
Geiger, A., et al., "Automatic Camera and Range Sensor Calibration using a Single Shot," 2012 IEEE International Conference on Robotics and Automation, May 14-18, 2012, 8 pages.

* cited by examiner

*Primary Examiner* — Jefferey Harold
*Assistant Examiner* — Omer Khalid
(74) *Attorney, Agent, or Firm* — Harrity & Harrity, LLP

(57) ABSTRACT

A device is configured to receive an image including a calibration pattern and apply a filter to the image based on a first coordinate plane. The device is configured to determine a first set of response peaks associated with the calibration pattern based on applying the filter, the first set of response peaks being associated with a set of control points and a set of boundary points. The device is configured to determine a second set of response peaks associated with the calibration pattern based on a second coordinate plane and a third coordinate plane, the second set of response peaks being associated with the boundary points. The device is configured to determine the control points based on determining the first set of response peaks and the second set of response peaks, and provide information that identifies the control points.

20 Claims, 11 Drawing Sheets

Image with Control Points Identified

DETECTING CONTROL POINTS FOR CAMERA CALIBRATION

DETAILED DESCRIPTION

The following detailed description of example implementations refers to the accompanying drawings. The same reference numbers in different drawings may identify the same or similar elements.

A user of a camera device (e.g., a digital camera, a video camera, etc.) may extract information from an image (e.g., a photograph, a video, etc.) captured by the camera device. To ensure the accuracy of the information extracted from the image, the user may employ camera calibration. Camera calibration may include determining the true parameters of a camera device that produced an image, such as a focal length, a pixel size, an amount of lens distortion, or the like. Such a determination may be necessary to use the camera device for quality assurance in manufacturing, generating three-dimensional images, identifying objects in the image, or the like.

To achieve camera calibration, the user may use the camera device to take one or more images of a calibration pattern. Effective camera calibration may require a camera calibration device to determine control points associated with the calibration pattern. A control point may include a point where a shape (e.g., a square, a circle, a line, etc.) associated with the calibration pattern intersects with another shape associated with the calibration pattern. However, determining the control points may be inefficient, and may require a user to identify and/or select the control points manually. Implementations described herein may allow a camera calibration device to efficiently and accurately determine the control points of a calibration pattern without human assistance. In this manner, the camera calibration device may robustly determine the control points, despite lens distortion and/or an orientation of the calibration pattern.

Figure 1:
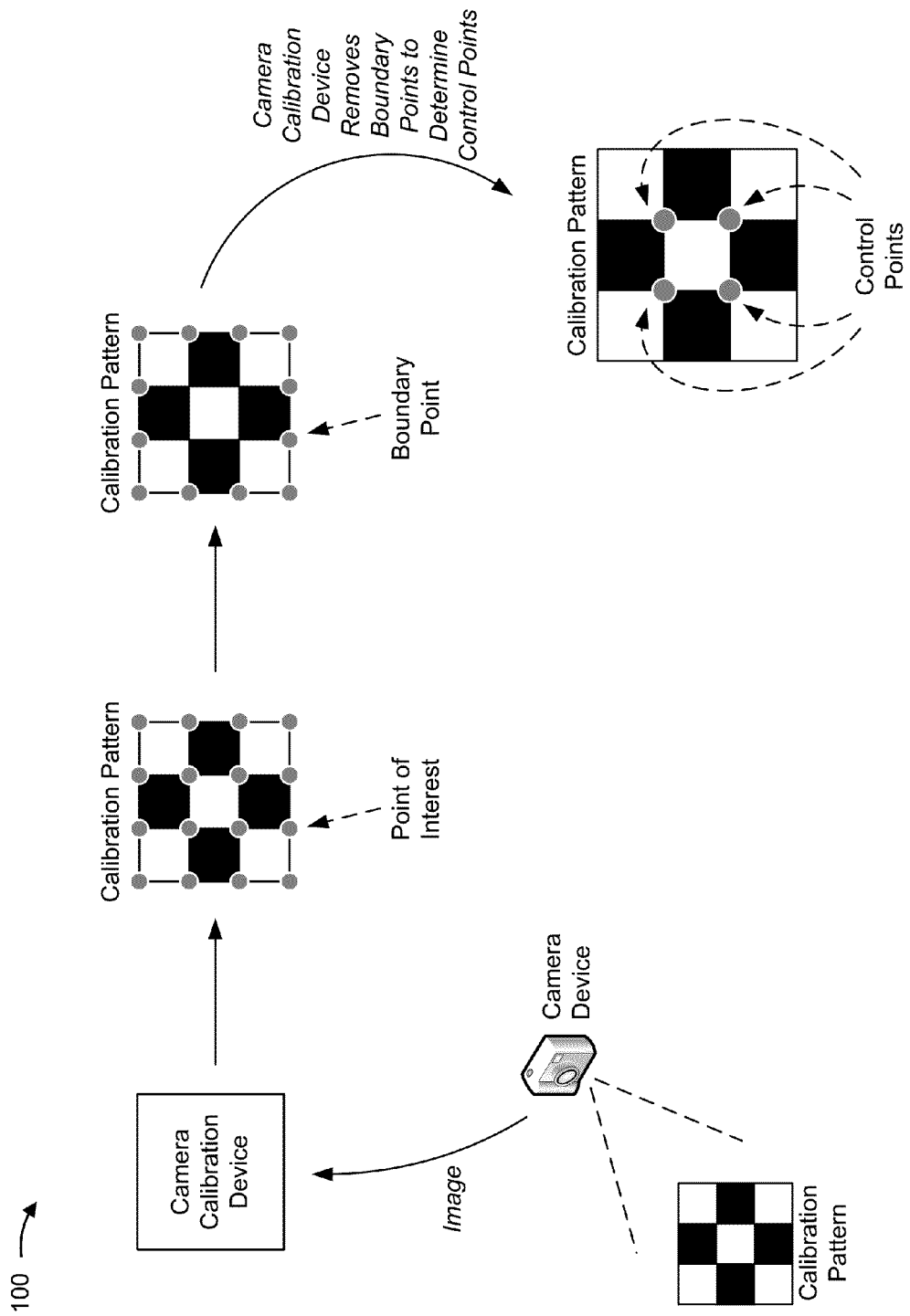
FIG. 1 is a diagram of an overview of an example implementation described herein.

FIG. 1 is a diagram of an overview of an example implementation 100 described herein. As shown in FIG. 1, example implementation 100 may include a calibration pattern, a camera device, and a camera calibration device.

As shown in FIG. 1, the camera device may take an image of the calibration pattern (e.g., a black and white checkerboard). The camera calibration device may receive the image from the camera device, and may apply a filter to the image. The camera calibration device may determine points of interest and boundary points by determining one or more derivatives associated with the filtered image. A point of interest may include a point in the calibration pattern where a shape in the calibration pattern has a corner point. A boundary point may include a point of interest that lies on an edge of the calibration pattern.

As further shown in FIG. 1, the camera calibration device may determine control points associated with the calibration pattern based on the derivatives of the image. A control point may include a point of interest that is interior to the edge of the calibration pattern (e.g., a point of interest that is not a boundary point). The camera calibration device may determine the control points by removing the boundary points from the points of interest. Distinguishing the boundary points from the control points may be necessary to more accurately perform camera calibration. In this manner, the camera calibration device may efficiently determine the control points of a calibration pattern, and may use the control points to calibrate the camera device.

Figure 2:
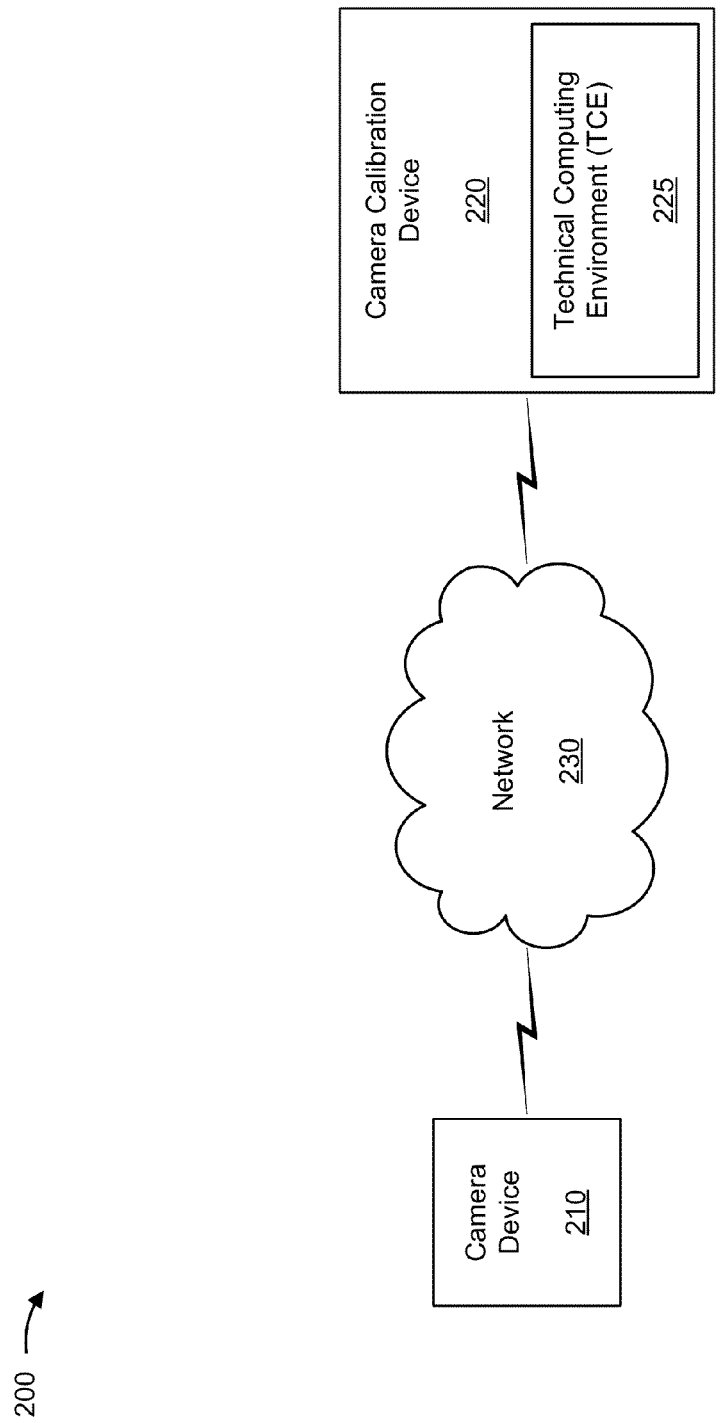
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a camera device 210, a camera calibration device 220, a technical computing environment 225, and a network 230. Devices of environment 200 may interconnect via wired connections, wireless connections, or a combination of wired and wireless connections.

Camera device 210 may include a device capable of capturing an image (e.g., a photograph, a digital picture, a video, etc.). For example, camera device 210 may include a camera (e.g., a digital camera, a web camera, etc.), a video camera (e.g., a camcorder, a movie camera), a smart camera, a mobile telephone (e.g., a smartphone, a cellular telephone, etc.) a computing device (e.g., a desktop computer, a laptop computer, a tablet computer, a handheld computer, etc.), or a similar device. In some implementations, camera device 210 may receive information from and/or transmit information to camera calibration device 220 (e.g., information associated with captured images).

Camera calibration device 220 may include a device capable of receiving and/or processing a captured image, and determining the control points of a calibration pattern included in the image. For example, camera calibration device 220 may include a computing device, such as a desktop computer, a laptop computer, a server, a tablet computer, a handheld computer, or a similar device. In some implementations, camera calibration device 220 may receive information from and/or transmit information to camera device 210 (e.g., information associated with a captured image).

Camera calibration device 220 may host TCE 225. TCE 225 may include any hardware-based logic or a combination of hardware-based logic and software-based logic that provides a computing environment that allows tasks to be performed (e.g., by users) related to disciplines, such as, but not limited to, mathematics, science, engineering, medicine, and business. TCE 225 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; etc.), or another type of environment, such as a hybrid environment that may include, for example, a text-based environment and a graphically-based environment.

Network 230 may include one or more wired and/or wireless networks. For example, network 230 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. Additionally, or alternatively, network 230 may include a high-definition multimedia interface ("HDMI") connection, a digital visual interface ("DVI") connection, a universal serial bus ("USB") connection, or a similar connection.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
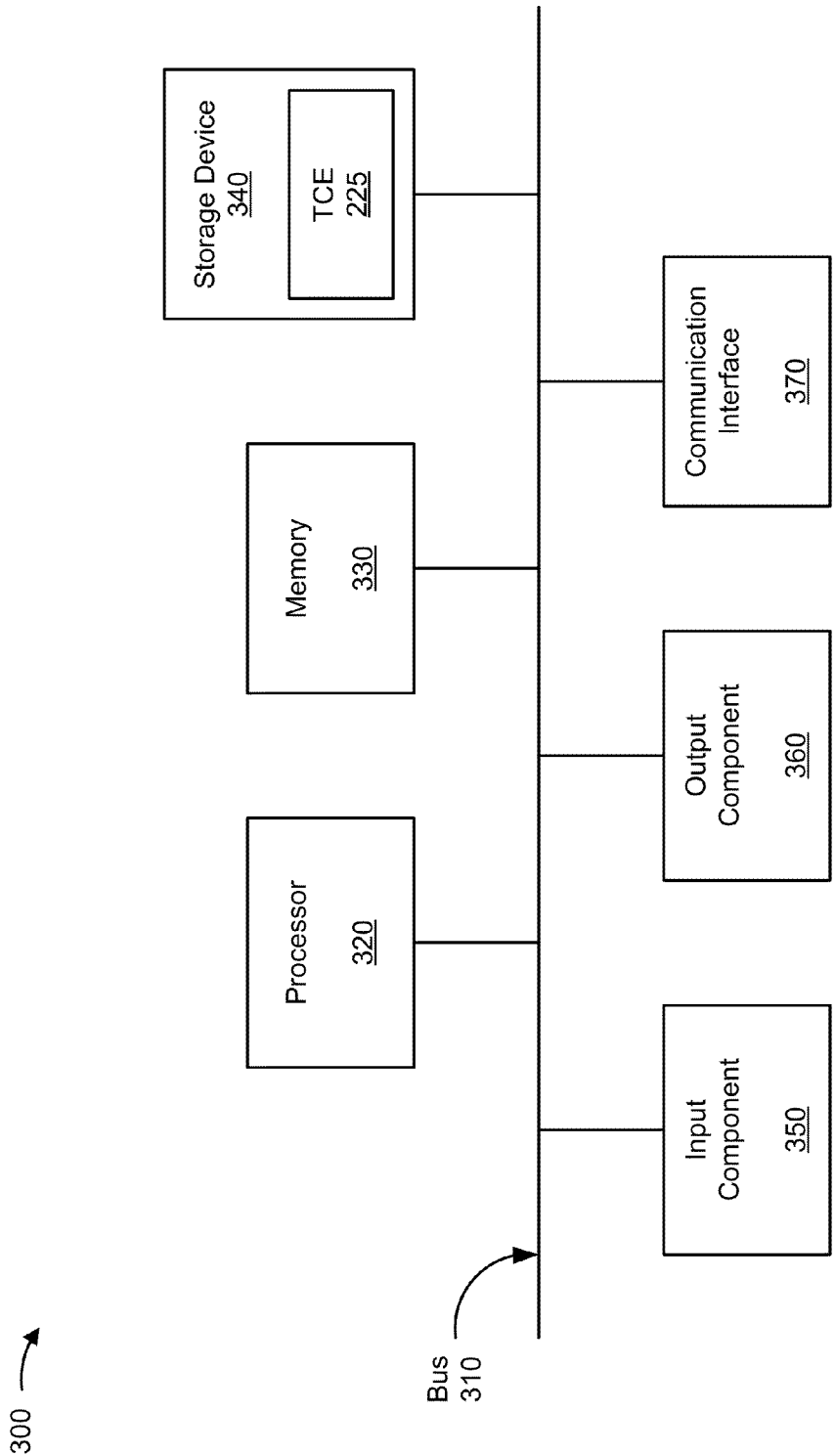
FIG. 3 is a diagram of example components of one or more devices of FIG. 2.

FIG. 3 is a diagram of example components of a device 300. Device 300 may correspond to camera device 210 and/or camera calibration device 220. Additionally, or alternatively, each of camera device 210 and/or camera calibration device 220 may include one or more devices 300 and/or one or more components of device 300. As shown in FIG. 3, device 300 may include a bus 310, a processor 320, a memory 330, a storage device 340, an input component 350, an output component 360, and a communication interface 370.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Storage device 340 may store information and/or software related to the operation and use of device 300. For example, storage device 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage device 340 may store TCE 225.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes ("LEDs"), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330 and/or storage device 340. A computer-readable medium may be defined as a non-transitory memory device. A memory device may include memory space within a single physical storage device or memory space spread across multiple physical storage devices.

Software instructions may be read into memory 330 and/or storage device 340 from another computer-readable medium or from another device via communication interface 370. When executed, software instructions stored in memory 330 and/or storage device 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
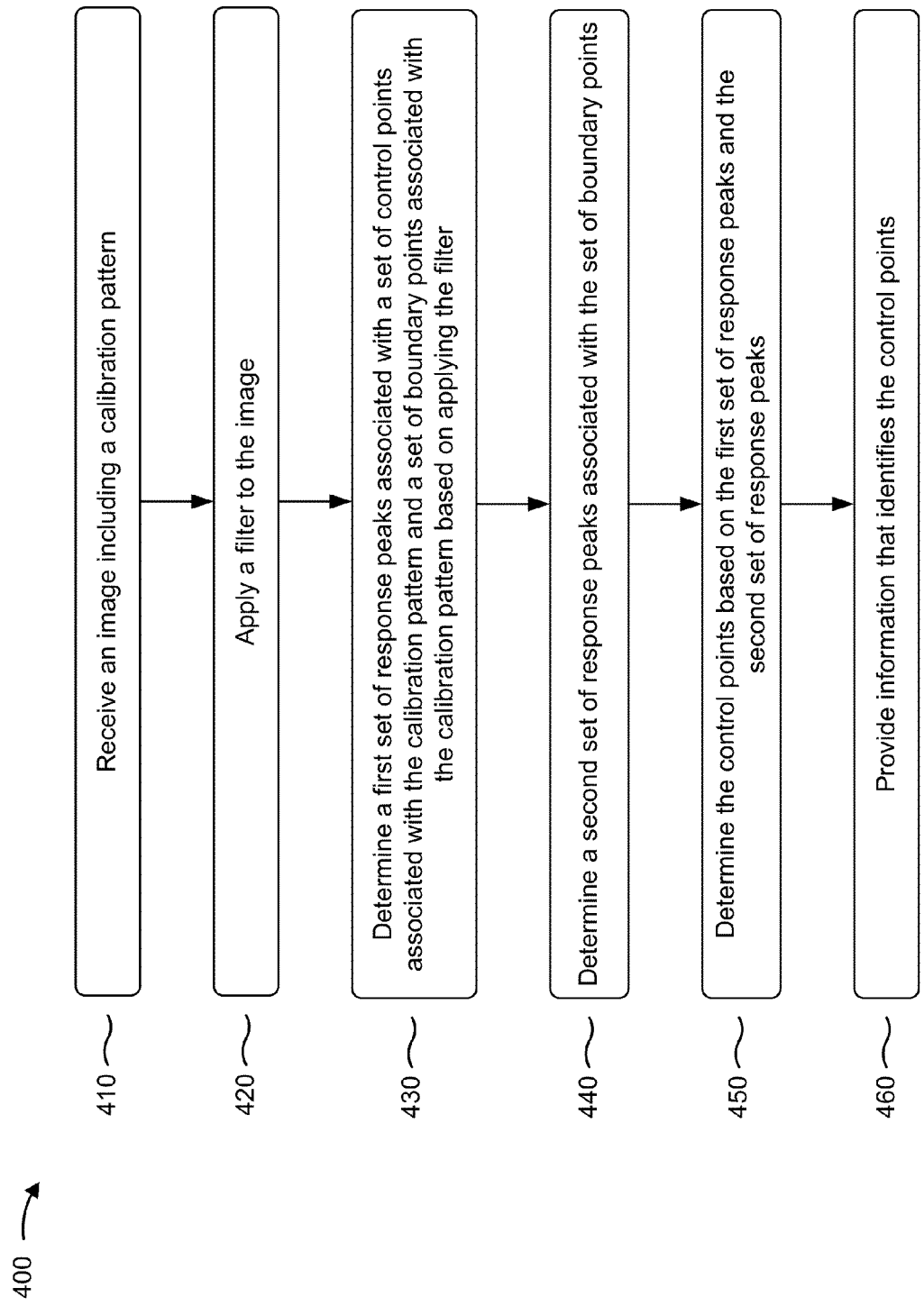
FIG. 4 is a flow chart of an example process for determining control points associated with a calibration pattern included in an image.

FIG. 4 is a flow chart of an example process 400 for determining control points associated with a calibration pattern included in an image. In some implementations, one or more process blocks of FIG. 4 may be performed by camera calibration device 220. Additionally, or alternatively, one or more process blocks of FIG. 4 may be performed by another device or a group of devices separate from or including camera calibration device 220, such as camera device 210.

As shown in FIG. 4, process 400 may include receiving an image including a calibration pattern (block 410). For example, camera device 210 may capture an image including a calibration pattern. Camera calibration device 220 may receive the image from camera device 210.

In some implementations, the calibration pattern may include a diagram (e.g., a figure, a design, a pattern, etc.) useful for calibrating an image. For example, the calibration pattern may include an arrangement of repeating shapes of alternatively light and dark colors. In some implementations, the calibration pattern may include a regular pattern of squares in alternating colors (e.g., a checkerboard). Additionally, or alternatively, the calibration pattern may include a quantity of repeating lines, circles, rectangles, or the like. In some implementations, the calibration pattern may include an object, a picture, a printout, or the like. Additionally, or alternatively, the calibration pattern may be projected by use of a projector (e.g., an image projected on to a screen, a wall, a backdrop, etc.). Camera device 210 may capture an image of the calibration pattern by taking a photograph of the calibration pattern, taking a video of the calibration pattern, etc.

In some implementations, camera device 210 may capture multiple images of the calibration pattern at different angles. For example, camera device 210 may take a quantity of images of the calibration pattern, with different images taken from different vantage points with respect to the calibration pattern (e.g., at a different position, distance, rotation, etc.). Additionally, or alternatively, camera device 210 may take the quantity of images from a single vantage point while the calibration pattern is moved (e.g., repositioned, rotated, etc.) from image to image. For example, a user of the calibration pattern may move the pattern into different positions while camera device 210 captures a quantity of images of the calibration pattern.

In some implementations, camera calibration device 220 may receive the image from camera device 210. For example, camera device 210 may upload the image to camera calibration device 220 via a network (e.g., the Internet, a cellular network, etc.), a direct connection (e.g., a USB connection, an HDMI connection, a FireWire connection, etc.), a storage device (e.g., a universal serial bus ("USB") flash drive, a portable hard disk drive ("HDD"), a memory card, etc.), or the like.

As further shown in FIG. 4, process 400 may include applying a filter to the image (block 420). For example, camera calibration device 220 may apply the filter to the image received from camera device 210.

In some implementations, the filter may include a process for removing one or more features from an image. For example, the filter may blur the image, may sharpen the image, may remove noise associated with the image, or the like. In some implementations, camera calibration device 220 may apply the filter to the image by transforming values associated with pixels in the image. For example, a pixel may include a smallest element of an image. The pixel may be associated with one or more values associated with one or more attributes (e.g., a color, an intensity, a brightness, etc.). Calibration device 220 may apply the filter to the image by changing a value associated with one or more pixels based on the filter (e.g., based on a property of the filter).

In some implementations, the filter may remove and/or suppress one or more frequencies associated with the image. For example, a frequency of the image may include a measure of how often a value (e.g., a value associated with one or more pixels) repeats and/or changes over a region. Regions of high frequency may correspond to regions of rapid change in pixel intensity (e.g., regions with lots of detail), and regions of low frequency may correspond to slow changes in pixel intensity (e.g., regions of uniform intensity). In some implementations, the filter may include a low-pass filter that preserves low frequencies (e.g., regions of uniform intensity) in the filtered image but reduces high frequencies (e.g., regions of lots of details). Application of a low-pass filter may blur the image.

In some implementations, camera calibration device 220 may apply the filter by convolution. Convolution may include a process that determines a filtered image based on an image and a filter that expresses how an attribute of the image (e.g., a brightness, an intensity, etc.) is modified by the filter. For example, the filter may include a convolution kernel, and camera calibration device 220 may apply the filter to the image by convolving the convolution kernel with the image.

In some implementations, the convolution kernel may include a weight matrix, and camera calibration device 220 may use the weight matrix to determine how each pixel in the image is to be transformed into a filtered image. For example, camera calibration device 220 may apply the weight matrix to corresponding pixels in a given region of the image, and may determine the output pixels based on the weight matrix. In some implementations, camera calibration device 220 may set each pixel's value to a weighted average of nearby pixels. The pixel's value may receive the heaviest weight, and nearby pixels may receive smaller weights based on their distance to the pixel. In some implementations, camera calibration device 220 may apply the weight matrix to the image in an iterative fashion until the entire image has been processed (e.g., converted to the filtered image).

In some implementations, the filter may include a Gaussian filter (e.g., a filter that outputs a Gaussian function). Additionally, or alternatively, camera calibration device 220 may apply a filter that approximates a Gaussian filter, such as a discrete Gaussian kernel (e.g., a Gaussian kernel that has been truncated), a sampled Gaussian kernel (e.g., a Gaussian kernel that has been sampled), or the like. For example, camera calibration device 220 may determine a weight matrix that approximates a Gaussian filter, and may apply the weight matrix to the image to determine the filtered image.

As further shown in FIG. 4, process 400 may include determining a first set of response peaks associated with control points of the calibration pattern and boundary points of the calibration pattern based on applying the filter (block 430). For example, camera calibration device 220 may determine the first set of response peaks based on applying the filter to the image received from camera device 210.

In some implementations, a control point may include a point where a shape (e.g., a square, a circle, a line, etc.) associated with the calibration pattern intersects with another shape associated with the calibration pattern. For example, for a calibration pattern that includes a checkerboard, a control point may include an intersection where two squares having a first tonal contrast (e.g., two light squares) and two squares having a second tonal contrast (e.g., two dark squares) share a common point (e.g., a common corner). In this manner, the control point may include a corner of a square that is interior to the checkerboard pattern (e.g., a corner not touching a border of the checkerboard). In some implementations, camera calibration device 220 may determine the control points to allow for accurate camera calibration.

In some implementations, a boundary point may include a point where the shape associated with the calibration pattern touches an edge of the calibration pattern. For example, for a calibration pattern that includes a checkerboard, the boundary point may include a point where a square touches a boundary of the checkerboard (e.g., a corner of a square along the edge of the checkerboard).

In some implementations, a response peak may include a local and/or global maximum and/or minimum in the change of brightness (and/or another attribute) of a filtered image. Camera calibration device 220 may determine a response peak by taking a derivative of the filtered image (e.g., an image convolved with a Gaussian filter). Additionally, or alternatively, camera calibration device 220 may determine a derivative of the Gaussian filter before applying the filter to the image (e.g., camera calibration device 220 may convolve a derivative of the Gaussian filter with the image).

In some implementations, taking a derivative of the filtered image may include determining how one quantity associated with the filtered image varies in response to changes in another quantity associated with the filtered image. For example, the filtered image may include a set of pixels arranged in a two-dimensional region (e.g., a rectangle comprising the filtered image). A pixel may be associated with a quantity of attributes, such as brightness, intensity, color, or the like. In some implementations, camera calibration device 220 may treat the filtered image (e.g., the set of pixels) as a function of two positions (e.g., an x-position and a y-position) with respect to a coordinate plane including a horizontal axis (e.g., an x-axis) and a vertical axis (e.g., a y-axis). For a grayscale filtered image, a given pixel in the filtered image (e.g., identified by a set of x and y coordinates) may correspond to a particular value of brightness. Camera calibration device 220 may determine a derivative of the filtered image by determining how one quantity (e.g., the brightness) changes in response to another quantity (e.g., an x-position, a y-position, etc.). A local and/or global maximum and/or minimum in the derivative of the filtered image may correspond to regions of the filtered image that undergo the most rapid changes in brightness as measured along the axis of derivation (e.g., the x-axis, the y-axis, etc.).

In some implementations, camera calibration device 220 may determine a first order partial derivative with respect to a position. For example, camera calibration device 220 may determine an x-derivative (e.g., a first order partial derivative with respect to x) by treating the vertical position as fixed (e.g., the y-position) while determining how an attribute of the image (e.g., brightness) varies in response to changing the x-position. Likewise, camera calibration device 220 may determine a y-derivative (e.g., a first order partial derivative with respect to y) by treating the horizontal position as fixed while determining how the attribute varies in response to changing the y-position.

In some implementations, camera calibration device 220 may determine the first set of response peaks by determining a cross derivative (e.g., a partial derivative of only mixed derivatives) of the filtered image. For example, camera calibration device 220 may determine a first order partial derivative (e.g., a partial derivative with respect to x) of the filtered image with respect to one of the coordinate axes (e.g., the x-axis) while holding other variables (e.g., the y-position) constant. Camera calibration device 220 may then take the result (e.g., the result of determining the first partial derivative) and determine a second order partial derivative with respect to the other coordinate axes (e.g., the y-axis) while holding other variables (e.g., the x-position) constant. In this manner, calibration device 220 may determine the first set of response peaks associated with the local and/or global maxima and/or minima in the derivative of the filtered image corresponding to regions of the filtered image that undergo the most rapid changes in an attribute as measured along the axis of derivation (e.g., the x-axis, the y-axis, etc.).

As further shown in FIG. 4, process 400 may include determining a second set of response peaks associated with the boundary points (block 440). For example, camera calibration device 220 may determine the second set of response peaks by determining a first order derivative of the filtered image at a different orientation than when determining the first set of response peaks. For example, camera calibration device 220 may determine the first order derivative at an angle (e.g., 30°, 60°, etc.) from the horizontal or vertical axis of the filtered image (e.g., based on the coordinate plane determined when applying the filter to the image).

In some implementations, camera calibration device 220 may determine derivatives at different orientations. For example, camera calibration device 220 may determine derivatives of the filtered image oriented at substantially 45° (e.g., rotated substantially 45° clockwise from the vertical axis) and substantially −45° (e.g., rotated substantially 45° counter-clockwise from the vertical axis). In some implementations, substantially 45° may include a range between 30° and 60° degrees. In this manner, camera calibration device 220 may determine the derivative along an angle that is diagonal to the calibration pattern (e.g., the checkerboard), for a calibration pattern that is oriented along the coordinate plane. Camera calibration device 220 may determine the second quantity of response peaks by adding the derivatives at the two angles.

In some implementations, camera calibration device 220 may determine the orientation of the derivative based on the orientation of the calibration pattern. For example, the image may include a calibration pattern at a particular orientation (e.g., rotated 30° counter-clockwise). Camera calibration device 220 may determine the first quantity of response peaks by determining the cross derivative with respect to the particular orientation of the calibration pattern (e.g., with respect to an x-axis and a y-axis rotated 30° counter-clockwise). Camera calibration device 220 may determine the second quantity of response peaks by determining first derivatives of the image at angles rotated 45° clockwise from the y-axis and 45° counter-clockwise from the y-axis.

In some implementations, camera calibration device 220 may determine the rotated derivatives by use of a steerable filter (e.g., a Gaussian filter). A steerable filter may include an orientation-selective filter (e.g., a convolution kernel) that may be expressed as a linear combination of rotated versions of the filter. For example, camera calibration device 220 may determine an x-derivative (e.g., a first order partial derivative with respect to the x-axis) and a y-derivative (e.g., a first order partial derivative with respect to the y-axis). Camera calibration device 220 may determine an oriented derivative (e.g., a derivative of the filtered image at an angle) by determining a linear combination of the x-derivative and the y-derivative. For example, camera calibration device 220 may determine the oriented derivative by adding the product of a sine of the angle and the x-derivative and the product of a cosine of the angle and the y-derivative.

As further shown in FIG. 4, process 400 may include determining the control points based on the first set of response peaks and the second set of response peaks (block 450). For example, camera calibration device 220 may determine the control points by removing, from the first set of response peaks (e.g., response peaks associated with the boundary points and the control points), the second set of response peaks (e.g., response peaks associated with the boundary points), thus leaving the response peaks associated with the control points.

In some implementations, camera calibration device 220 may determine the control points based on a formula of the form:

$$C = \sigma^2 I_{xy} - \sigma |I_{\pi/4} + I_{-\pi/4}|$$

where $I_{xy}$ is a cross derivative of the filtered image (e.g., the image convolved with a Gaussian filter), $I_{\pi/4}$ is a first order derivative of the filtered image oriented at 45°, $I_{-\pi/4}$ is a first order derivative of the filtered image oriented at −45°, and $\sigma$ is a standard deviation of a Gaussian filter. Camera calibration device 220 may determine the control points by determining the cross derivative of the filtered image (e.g., $I_{xy}$) and multiplying the cross derivative by the square of the standard deviation of the Gaussian filter (e.g., $\sigma^2$). From the resulting product (e.g., $\sigma^2 I_{xy}$), camera calibration device 220 may subtract the product of the standard deviation of the Gaussian filter (e.g., $\sigma$) and the absolute value of the sum of the first derivatives of the filtered image oriented at 45° and −45° (e.g., $I_{\pi/4} + I_{-\pi/4}$).

As further shown in FIG. 4, process 400 may include providing information that identifies the control points (block 460). For example, camera calibration device 220 may provide information that identifies the control points to camera device 210. In some implementations, based on the information that identifies the control points, camera calibration device 220 may remove the effects of lens distortion from an image, generate a three-dimensional image, identify objects in an image, or the like. Additionally, or alternatively, camera device 210 may receive the information that identifies the control points and may remove the effects of lens distortion from an image, generate a three-dimensional image, identify objects in an image, or the like, based on the information (e.g., based on the control points).

In some implementations, camera calibration device 220 may use the control points to determine the calibration pattern (e.g., to identify the checkerboard). For example, camera calibration device 220 may determine a starting control point, and may determine nearby control points along an orientation that approximates an orientation of the calibration image. Camera calibration device 220 may determine a grid based on the starting control point and the nearby control points, and may modify the grid by determining additional nearby control points along the orientation. In this manner, camera calibration device 220 may modify the grid until the grid approximates the calibration pattern (e.g., until the grid resembles the checkerboard).

In some implementations, camera calibration device 220 may determine calibration parameters based on the control points. For example, camera device 210 may be associated with a lens possessing a defect (e.g., an aberration, a deformation, etc.) that causes images taken by camera device 210 to be distorted, and camera calibration device 220 may use the control points identified in the image of the calibration pattern to correct for the defect. Camera device 210 may take a set of images including a calibration pattern, with each image including a different orientation of the calibration pattern (e.g., images taken of the calibration pattern from different angles). Camera calibration device 220 may determine the control points associated with each image of the quantity of images.

Based on determining the control points associated with each of the quantity of images, camera calibration device 220 may determine the calibration parameters (e.g., a set of parameters used to calibrate camera device 210). In some implementations, the calibration parameters may include a camera projection matrix. The camera projection matrix may include a matrix that describes how objects in real space (e.g., in the real world) correspond to pixels on the image (e.g., how three-dimensional objects are projected on to a two-dimensional image). The camera projection matrix may depend on intrinsic properties of camera device 210 (e.g., a focal length, an image format, a principal point, etc.) and/or extrinsic properties of camera device 210 (e.g., a position of a camera center). In some implementations, the camera projection matrix may be represented as a series of transformations, including a matrix of intrinsic parameters, a rotation matrix, and/or a translation vector.

In some implementations, camera calibration device 220 may use the calibration parameters to calibrate camera device 210. For example, camera calibration device 220 may use the camera projection matrix to associate points in the image with locations in the real world (e.g., locations of objects in the image). Based on the camera projection matrix, camera calibration device 220 may correct an image to more accurately display objects in the image (e.g., remove aberrations, distortions, etc.).

While a series of blocks has been described with regard to FIG. 4, the blocks and/or the order of the blocks may be modified in some implementations. Additionally, or alternatively, non-dependent blocks may be performed in parallel. Furthermore, one or more blocks may be omitted in some implementations.

FIGS. 5A-5E are diagrams of an example implementation 500 relating to process 400 shown in FIG. 4. In example implementation 500, the calibration pattern may include a checkerboard, and camera calibration device 220 may determine the control points of the checkerboard by use of a Gaussian filter.

Figure 5A:
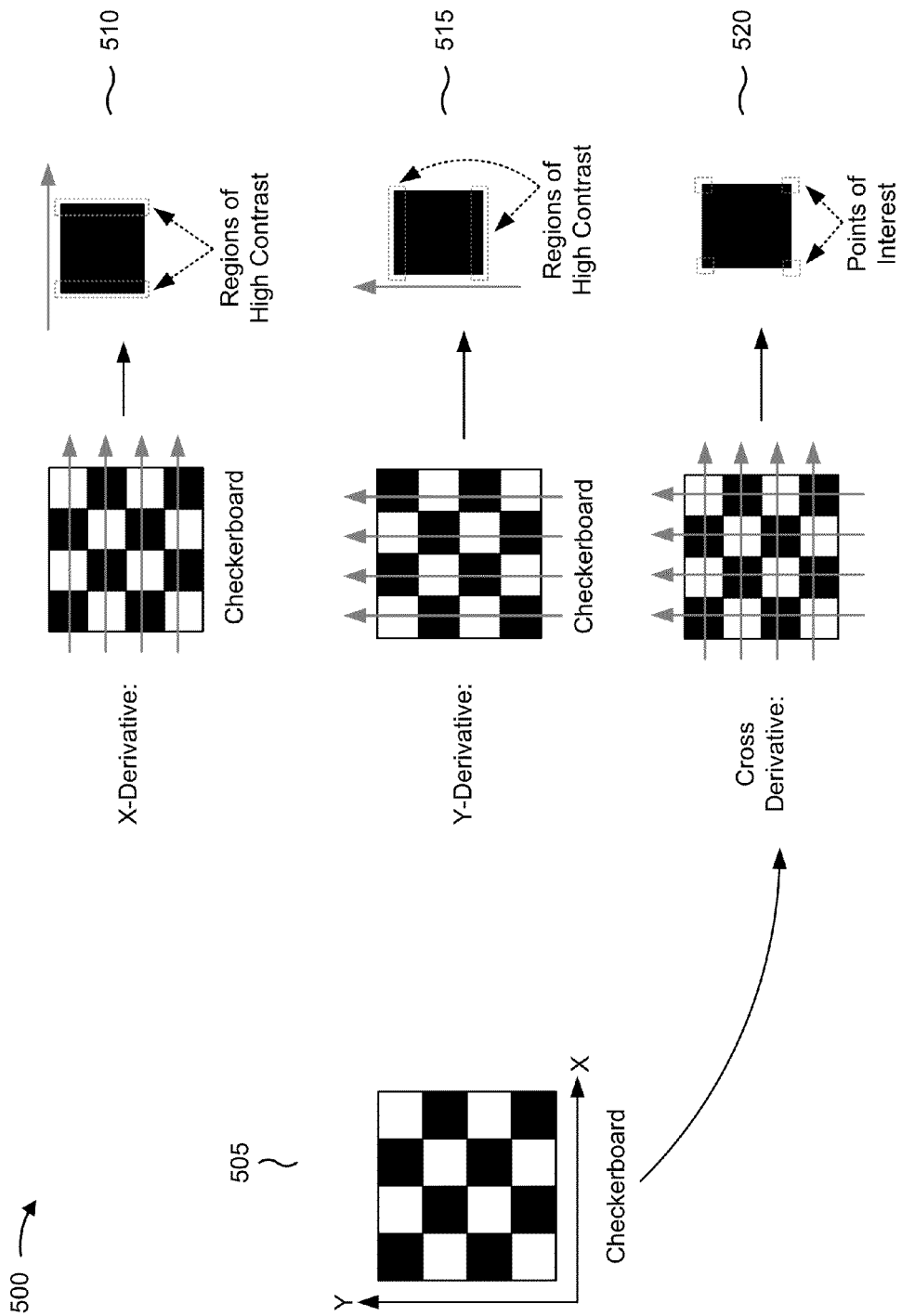
FIGS. 5A-5E are diagrams of an example implementation relating to the example process shown in FIG. 4.

As shown in FIG. 5A, and by reference number 505, camera calibration device 220 may receive an image that includes a checkerboard. Camera calibration device 220 may define a coordinate plane for the image, with an x-axis (e.g., a horizontal axis) parallel to the length of the checkerboard and a y-axis (e.g., a vertical axis) parallel to the height of the checkerboard. Camera calibration device 220 may apply a Gaussian filter to the image (e.g., by convolution of the Gaussian filter and the image), resulting in a filtered image.

As further shown in FIG. 5A, camera calibration device 220 may determine regions of high contrast in the filtered image. The regions of high contrast may include regions of the checkerboard that change rapidly in brightness while moving along an axis (e.g., edges, corners, boundaries, etc.). For example, camera calibration device 220 may determine a first order partial derivative of the filtered image with respect to the x-position (e.g., an x-derivative), as shown by reference number 510. By calculating the x-derivative, camera calibration device 220 may determine response peaks associated with regions of high contrast while moving along the x-axis. Additionally, or alternatively, camera calibration device 220 may determine a first order partial derivative of the filtered image with respect to the y-position (e.g., a y-derivative), as shown by reference number 515. By calculating the y-derivative, camera calibration device 220 may determine response peaks associated with regions of high contrast while moving along the y-axis.

As shown by reference number 520, camera calibration device 220 may determine the first set of response peaks by determining a cross derivative of the filtered image. For example, camera calibration device 220 may determine a first order partial derivative of the filtered image with respect to the x-axis, and may determine a second order partial derivative with respect to the y-axis. The result of the cross derivative may correspond to points of interest on the checkerboard (e.g., corners of squares).

Figure 5B:
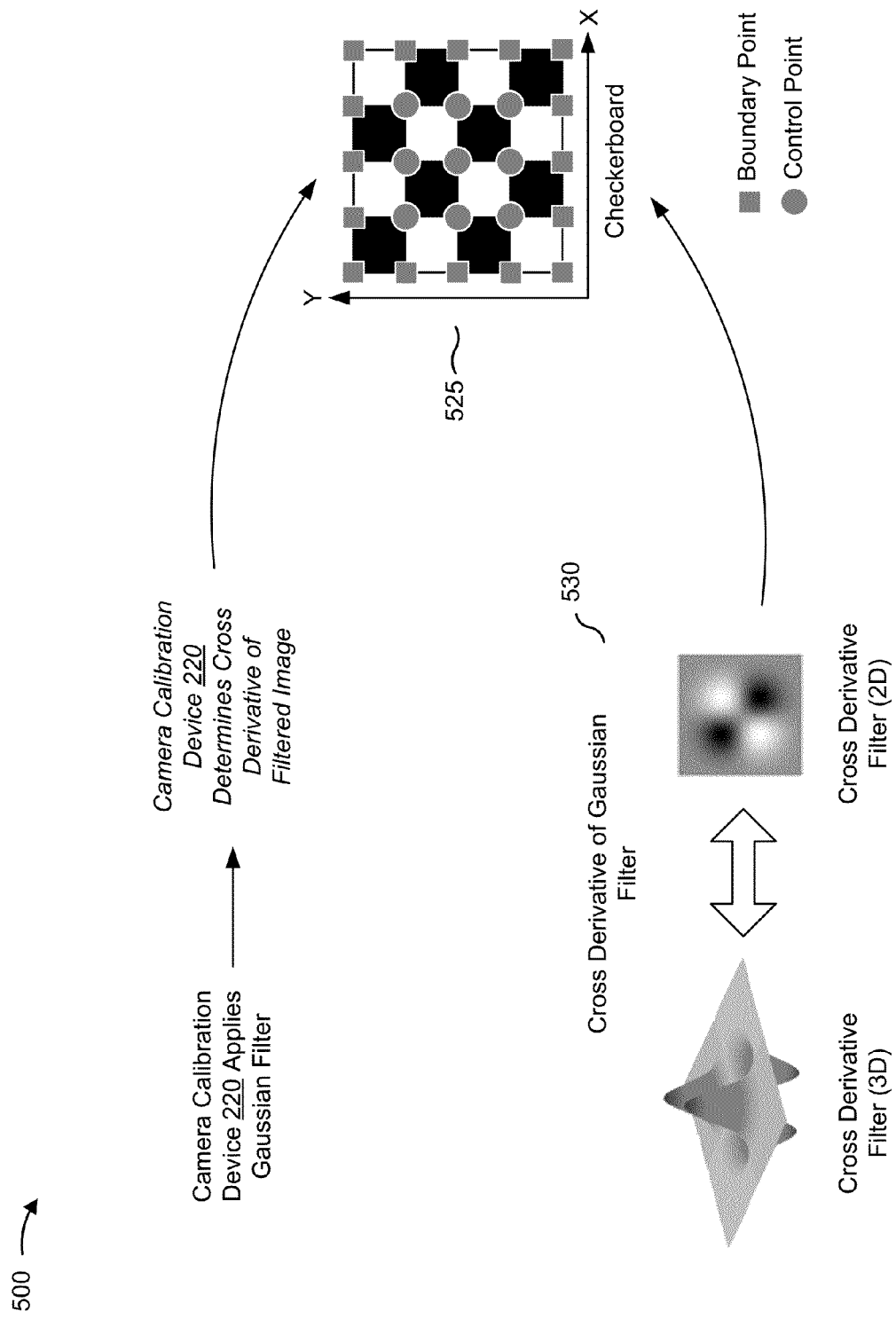

As shown in FIG. 5B, and by reference number 525, the points of interest associated with the first set of response peaks may include control points and boundary points. In some implementations, camera calibration device 220 may apply the filter to the image, and may determine the first set of response peaks by determining the cross derivative of the filtered image. Additionally, or alternatively, camera calibration device 220 may determine the cross derivative of the filter (e.g., a Gaussian filter), and may determine the first set of response peaks by applying the cross derivative filter (e.g., the cross derivative of the Gaussian filter) to the image, as shown by reference number 530.

Figure 5C:
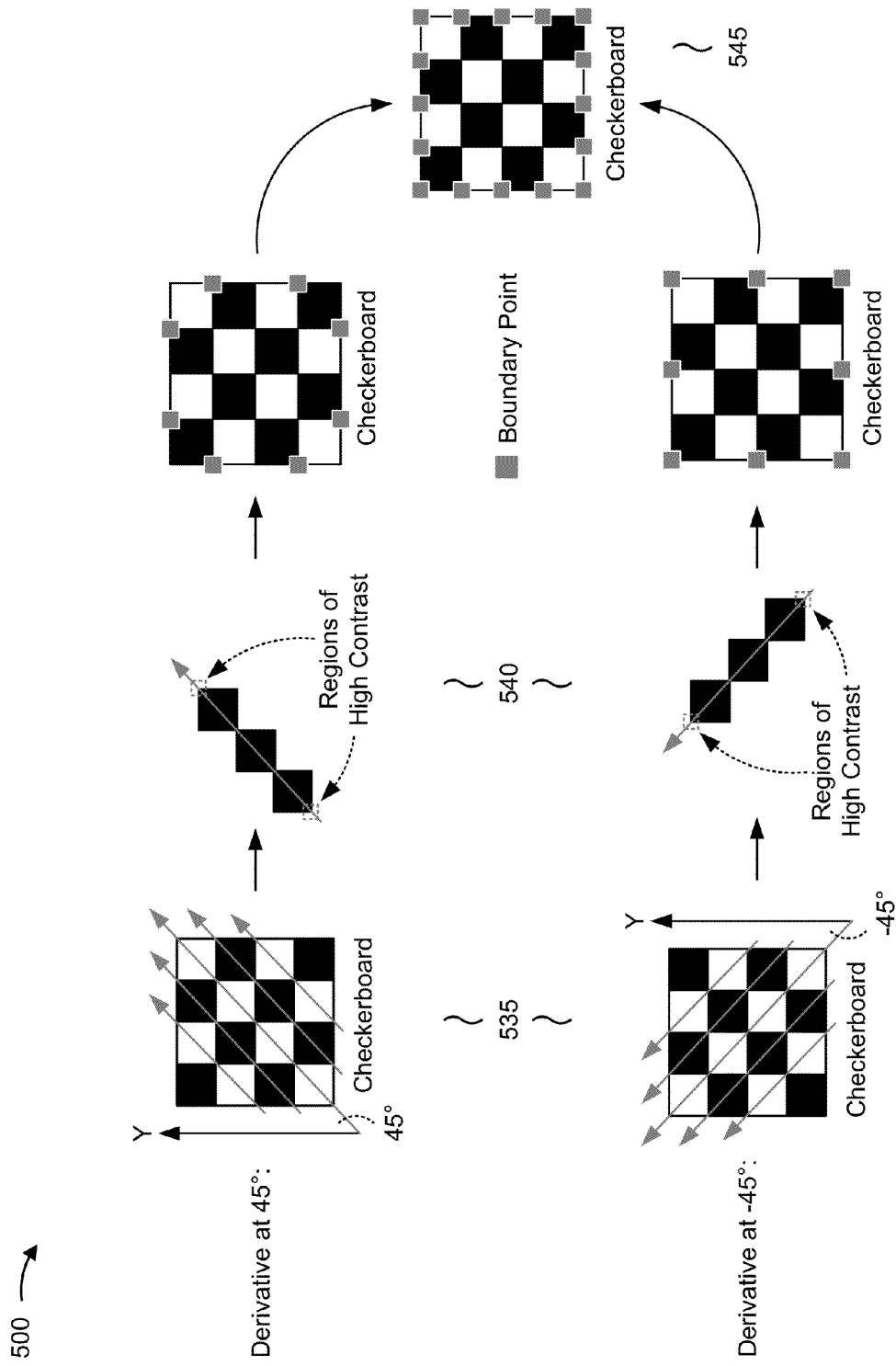

As shown in FIG. 5C, and by reference number 535, camera calibration device 220 may determine a second set of response peaks by determining a first order partial derivative with respect to an axis rotated 45° clockwise from the y-axis (e.g., a 45° derivative), and a first order partial derivative with respect to an axis rotated 45° counter-clockwise from the y-axis (e.g., a −45° derivative). As camera calibration device 220 determines a derivative along the diagonal of the checkerboard, the regions of high contrast may correspond to regions on the boundary of the checkerboard (e.g., boundary points), as shown by reference number 540. Camera calibration device 220 may determine the boundary points by combining the 45° derivative and the −45° derivative, as shown by reference number 545.

Figure 5D:
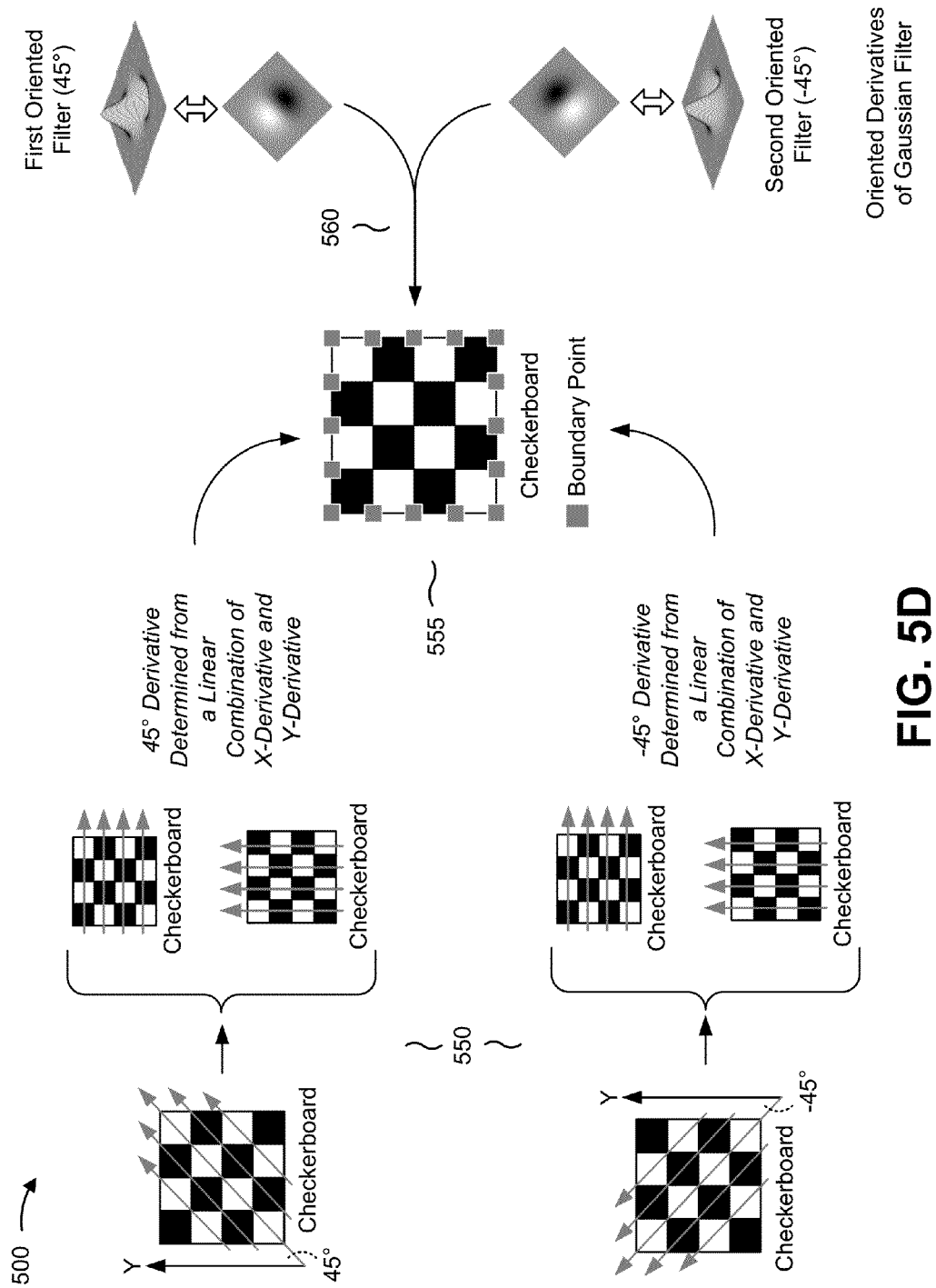

As shown in FIG. 5D, and by reference number 550, in some implementations, camera calibration device 220 may determine the 45° derivative and/or the −45° derivative by combining the x-derivative and the y-derivative (e.g., a basis of first order partial derivatives) via a linear combination. For example, camera calibration device 220 may determine the 45° derivative and/or the −45° derivative based on a linear combination of the x-derivative and the y-derivative, with each derivative multiplied by a function of the angle (e.g., a sine of the angle, a cosine of the angle, etc.) at which camera calibration device 220 may determine the derivative. Based on determining the 45° derivative and the −45° derivative, camera calibration device 220 may combine the 45° derivative and/or the −45° derivative to determine the second set of response peaks and corresponding boundary points, as shown by reference number 555. Additionally, or alternatively, camera calibration device 220 may determine a 45° derivative and a −45° derivative of the filter (e.g., the Gaussian filter), and may determine the second set of response peaks by applying a first oriented filter (e.g., the 45° derivative of the Gaussian filter) and a second oriented filter (e.g., the −45° derivative of the Gaussian filter) to the image, as shown by reference number 560.

Figure 5E:
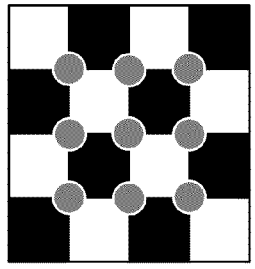
Figure 5E:
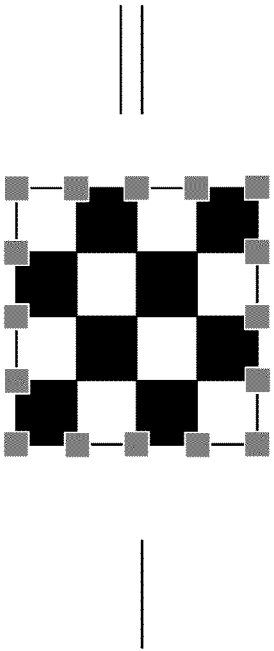
Figure 5E:
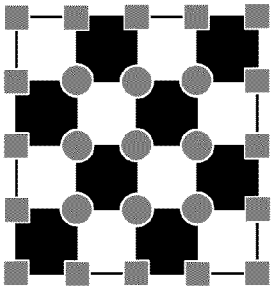

As shown in FIG. 5E, and by reference number 565, camera calibration device 220 may determine the control points by removing the second set of response peaks (e.g., corresponding to the boundary points) from the first set of response peaks (e.g., corresponding to the control points and the boundary points). The remaining response peaks may correspond to the control points, as shown by reference number 570.

As indicated above, FIGS. 5A-5E are provided merely as an example. Other examples are possible and may differ from what was described with regard to FIGS. 5A-5E.

Figure 6:
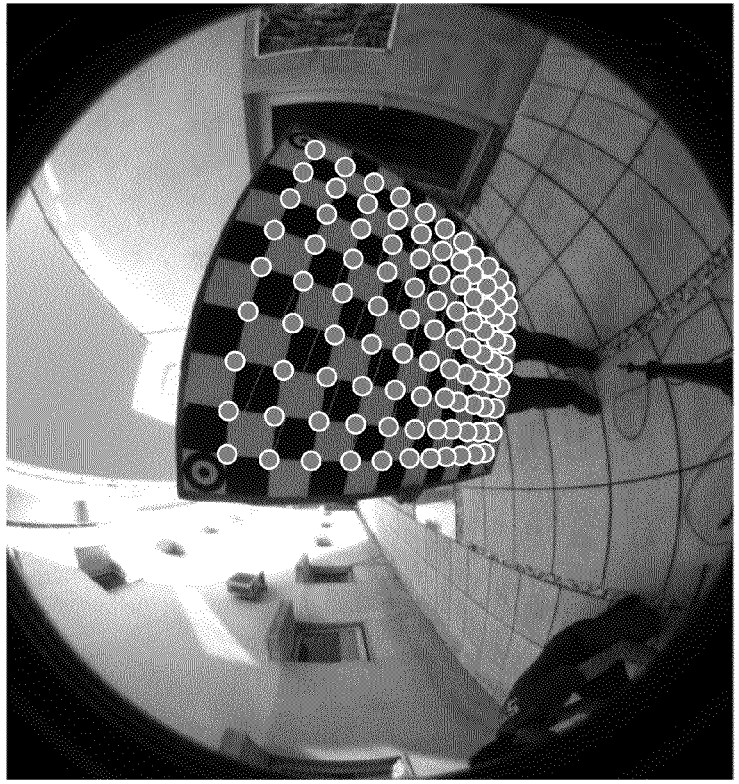
FIG. 6 is a diagram of another example implementation relating to the example process shown in FIG. 4.
Figure 6:
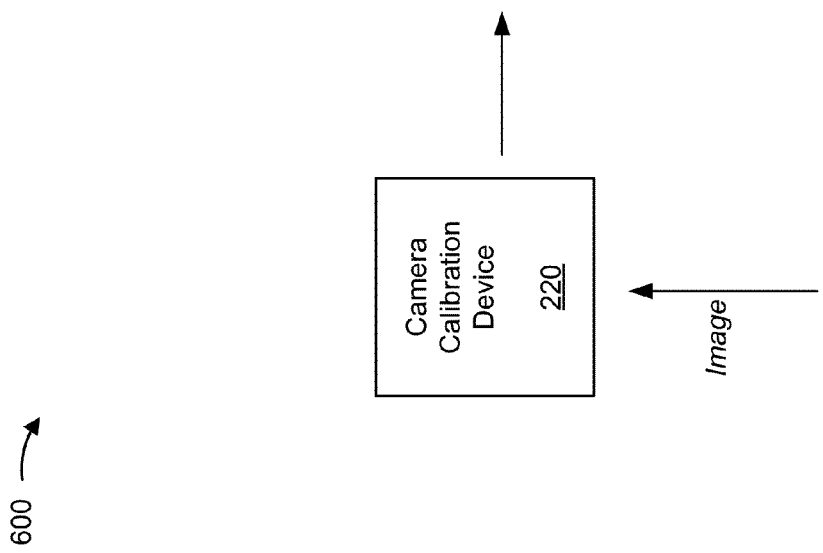

FIG. 6 is a diagram of another example implementation 600 relating to process 400 shown in FIG. 4. In example implementation 600, camera calibration device 220 may receive an image of a checkerboard, and may determine control points associated with the checkerboard.

As shown in FIG. 6, camera calibration device 220 may receive an image of a checkerboard from camera device 210. The checkerboard may be distorted by a mirror and/or a lens. Camera calibration device 220 may apply a Gaussian filter to the image to determine a filtered image. Camera calibration device 220 may determine a cross derivative of the filtered image with respect to a coordinate axis based on the vertical and horizontal axes of the image. Based on the cross derivative, camera calibration device 220 may determine a first set of response peaks associated with the control points and boundary points of the checkerboard. Camera calibration device 220 may determine a derivative of the filtered image at an angle of 45° from the horizontal of the image, and may determine a derivative of the filtered image at an angle of −45° from the horizontal of the image. Based on the derivatives, camera calibration device 220 may determine a second set of response peaks associated with the boundary points of the checkerboard. Camera calibration device 220 may determine the control points of the checkerboard based on removing the second set of response peaks from the first set of response peaks.

As further shown in FIG. 6, camera calibration device 220 may provide the image for display (e.g., on a computing device). Camera calibration device 220 may display the control points of the checkerboard by overlaying the control points with the image. In some implementations, camera calibration device 220 may receive an indication from a user of calibration device 220. For example, the indication may provide a confirmation by the user that the control points determined by camera calibration device 220 correspond to the points on the checkerboard where four squares intersect. Additionally, or alternatively, camera calibration device 220 may receive an indication from the user indicating where a control point should be placed.

As indicated above, FIG. 6 is provided merely as an example. Other examples are possible and may differ from what was described with regard to FIG. 6.

Figure 7:
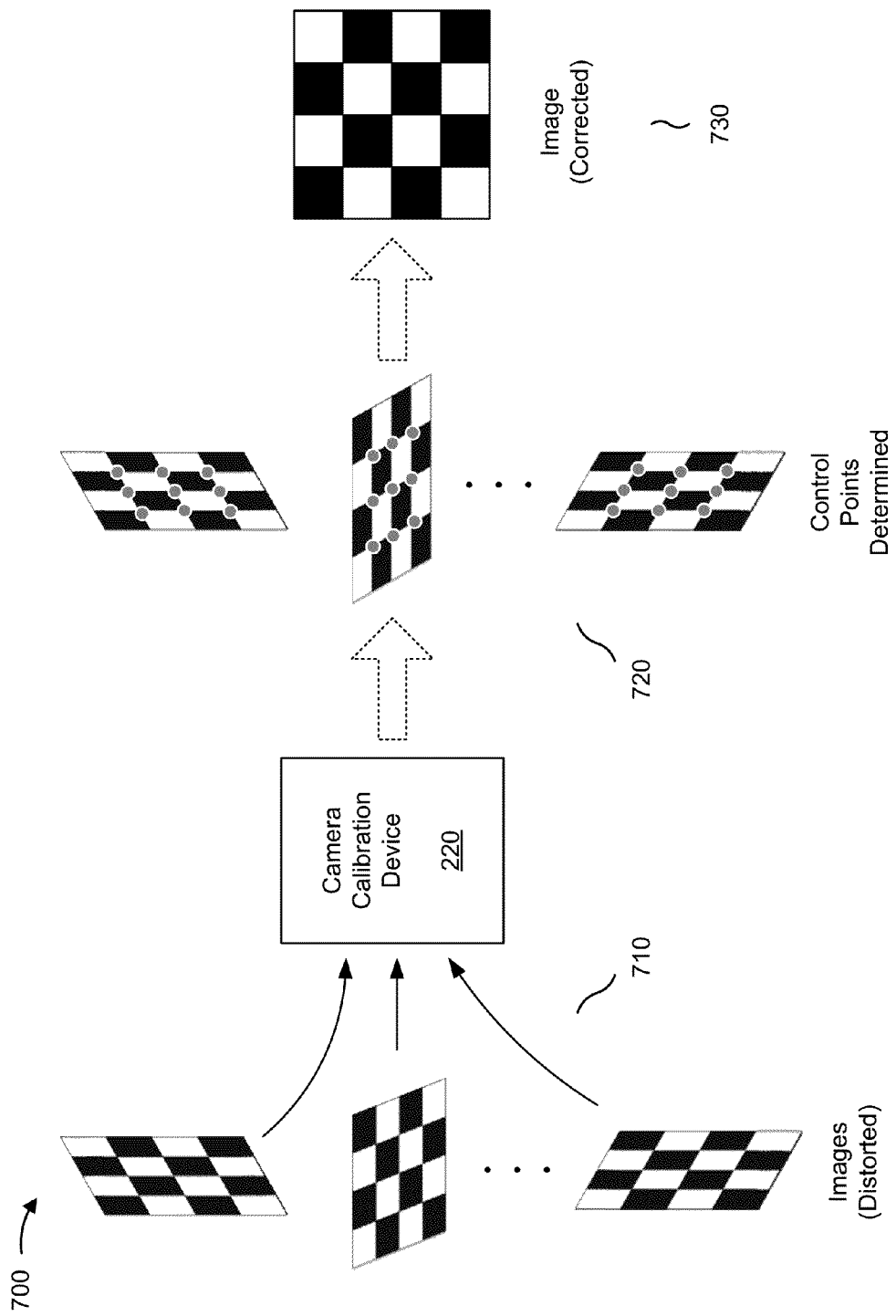
FIG. 7 is a diagram of yet another example implementation relating to the example process shown in FIG. 4.

FIG. 7 is a diagram of yet another example implementation 700 relating to process 400 shown in FIG. 4. In example implementation 700, camera calibration device 220 may receive a set of images including a calibration pattern (e.g., a checkerboard). Camera calibration device 220 may determine the control points associated with the calibration pattern in each image, and may generate a corrected image based on the control points.

As shown by reference number 710, camera calibration device 220 may receive images from camera device 210. The images may be distorted due to a defect of a lens associated with camera device 210. Each image may include a calibration pattern. In each image, the calibration pattern may be oriented in different ways depending on the angle and/or rotation of camera device 210 and/or the calibration pattern when camera device 210 captured each image.

As shown by reference number 720, camera calibration device 220 may determine control points associated with the calibration pattern in each image. For example, camera calibration device 220 may apply a Gaussian filter to each image to generate a filtered image. Camera calibration device 220 may determine a first set of response peaks associated with control points and boundary points of the calibration pattern in each filtered image (e.g., by determining a cross derivative of each filtered image). Camera calibration device 220 may determine a second set of response peaks associated with the boundary points of the calibration pattern (e.g., by determining derivatives of each filtered image at angles of 45° and −45° from the y-axis). Camera calibration device 220 may determine the control points of the calibration pattern associated with each image based on removing the second set of response peaks from the first set of response peaks.

As shown by reference number 730, camera calibration device 220 may use the control points associated with the set of images to generate a corrected image (e.g., an image free of errors due to the defect). For example, camera calibration device 220 may determine a camera projection matrix that associates points in the images with locations in the real world. Based on the camera projection matrix, camera calibration device 220 may correct an image to more accurately display objects in the image (e.g., to display a checkerboard that is not distorted).

As indicated above, FIG. 7 is provided merely as an example. Other examples are possible and may differ from what was described with regard to FIG. 7.

Implementations described herein may allow a camera calibration device to determine control points associated with a calibration pattern in an image taken by the camera device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, a "set," as used herein, is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
receive an image including a calibration pattern;
apply a cross derivative filter to the image based on a first coordinate plane,
the cross derivative filter including a cross derivative of a Gaussian function;
determine a first plurality of response peaks associated with the calibration pattern based on applying the cross derivative filter,
the first plurality of response peaks being associated with a plurality of control points associated with the calibration pattern and a plurality of boundary points associated with the calibration pattern,
the plurality of boundary points being points along an edge of the calibration pattern;
determine a second plurality of response peaks associated with the calibration pattern based on applying a first filter, including a derivative of the Gaussian function based on a second coordinate plane, and applying a second filter, including a derivative of the Gaussian function based on a third coordinate plane,
the second plurality of response peaks being associated with the plurality of boundary points;
determine the plurality of control points based on removing the second plurality of response peaks, associated with the plurality of boundary points, from the first plurality of response peaks; and
provide information that identifies the plurality of control points.

2. The device of claim 1, where the second coordinate plane is rotated substantially forty-five degrees clockwise from the first coordinate plane; and
where the third coordinate plane is rotated substantially forty-five degrees counter-clockwise from the first coordinate plane.

3. The device of claim 1, where the calibration pattern includes a checkerboard pattern of a plurality of squares;
where a control point, of the plurality of control points, includes a point where two squares, of the plurality of squares, having a first tonal contrast, respectively, and two squares, of the plurality of squares, having a second tonal contrast, respectively, share a common border,
the first tonal contrast being lighter than the second tonal contrast; and
where a boundary point, of the plurality of boundary points, includes a point along an edge of the checkerboard pattern.

4. The device of claim 1, where the one or more processors, when applying the cross derivative filter to the image, are to:
determine an orientation of the calibration pattern; and
determine the first coordinate plane based on the orientation of the calibration pattern.

5. The device of claim 1, where at least one of the first filter or the second filter includes at least one of:
an x-derivative of a Gaussian function;
a y-derivative of a Gaussian function; or
a linear combination of an x-derivative and a y-derivative.

6. The device of claim 1, where the one or more processors, when determining the second plurality of response peaks, are to:
determine a first derivative of the image with respect to an x-axis,
the x-axis being associated with a coordinate associated with the first coordinate plane;
determine a second derivative of the image with respect to a y-axis,
the y-axis being associated with another coordinate associated with the first coordinate plane, and
the y-axis being perpendicular to the x-axis;
determine a linear combination of the first derivative and the second derivative based on the second coordinate plane and the third coordinate plane; and
determine the second plurality of response peaks based on the linear combination of the first derivative and the second derivative.

7. The device of claim 1, where the one or more processors are further to:
determine a camera projection matrix based on the plurality of control points; and
calibrate a camera based on the camera projection matrix.

8. A non-transitory computer-readable medium storing instructions, the instructions comprising:
one or more instructions that, when executed by one or more processors of a device, cause the one or more processors to:
receive an image including a calibration pattern;
apply a cross derivative filter to the image based on a first coordinate plane,
the cross derivative filter including a cross derivative of a Gaussian function;
determine a first plurality of response peaks associated with the calibration pattern based on applying the cross derivative filter,
the first plurality of response peaks being associated with a plurality of control points associated with the calibration pattern and a plurality of boundary points associated with the calibration pattern,
the plurality of boundary points being points along an edge of the calibration pattern;
apply a first oriented filter to the image,
the first oriented filter including a derivative of the Gaussian function based on a second coordinate plane;
apply a second oriented filter to the image,
the second oriented filter including a derivative of the Gaussian function based on a third coordinate plane;
determine a second plurality of response peaks associated with the calibration pattern based on the first oriented filter and the second oriented filter,
the second plurality of response peaks being associated with the plurality of boundary points;
determine the plurality of control points based on removing the second plurality of response peaks, associated with the plurality of boundary points, from the first plurality of response peaks; and
provide information that identifies the plurality of control points.

9. The non-transitory computer-readable medium of claim 8, where the second coordinate plane is rotated substantially forty-five degrees clockwise from the first coordinate plane; and
where the third coordinate plane is rotated substantially forty-five degrees counter-clockwise from the first coordinate plane.

10. The non-transitory computer-readable medium of claim 8, where the calibration pattern includes a checkerboard pattern of a plurality of squares;
where a control point, of the plurality of control points, includes a point where two squares, of the plurality of squares, having a first tonal contrast, respectively, and two squares, of the plurality of squares, having a second tonal contrast, respectively, share a common border,
the first tonal contrast being lighter than the second tonal contrast; and
where a boundary point, of the plurality of boundary points, includes a point along an edge of the checkerboard pattern.

11. The non-transitory computer-readable of claim 8, where the one or more instructions, that cause the one or more processors to apply the cross derivative filter to the image, further cause the one or more processors to:
determine an orientation of the calibration pattern; and
determine the first coordinate plane based on the orientation of the calibration pattern.

12. The non-transitory computer-readable medium of claim 8, where the one or more instructions that, when executed by the one or more processors, cause the one or more processors to apply the first oriented filter, further cause the one or more processors to:
determine a first derivative of the Gaussian function with respect to an x-axis,
the x-axis being associated with the first coordinate plane;
determine a second derivative of the Gaussian function with respect to a y-axis,
the y-axis being associated with the first coordinate plane, and
the y-axis being perpendicular to the x-axis;
determine a linear combination of the first derivative and the second derivative based on the second coordinate plane and the third coordinate plane; and
determine the second plurality of response peaks based on the linear combination of the first derivative and the second derivative.

13. The non-transitory computer-readable medium of claim 8, where the instructions further comprise:
one or more instructions that, when executed by the one or more processors, cause the one or more processors to:
determine a camera projection matrix based on the plurality of control points; and
calibrate a camera based on the camera projection matrix.

14. A method comprising:
receiving an image including a calibration pattern,
the receiving the image being performed by a device;
applying a cross derivative filter to the image based on a first coordinate plane,
the cross derivative filter including a cross derivative of a Gaussian function,
the applying the cross derivative filter to the image being performed by the device;
determining a first plurality of response peaks associated with the calibration pattern based on applying the cross derivative filter,
the first plurality of response peaks being associated with a plurality of control points associated with the calibration pattern and a plurality of boundary points associated with the calibration pattern,
the plurality of boundary points being points along an edge of the calibration pattern, and
the determining the first plurality of response peaks being performed by the device;
determining a second plurality of response peaks associated with the calibration pattern based on applying a first filter, including a derivative of the Gaussian function based on a second coordinate plane, and applying a second filter, including a derivative of the Gaussian function based on a third coordinate plane,
the second plurality of response peaks being associated with the boundary points, and
the determining the second plurality of response peaks being performed by the device;
determining the plurality of control points based on removing the second plurality of response peaks, associated with the plurality of boundary points, from the first plurality of response peaks,
the determining the plurality of control points being performed by the device; and
providing information that identifies the plurality of control points,
the providing information that identifies the plurality of control points being performed by the device.

15. The method of claim 14, where the calibration pattern includes a checkerboard pattern of a plurality of squares;
where a control point, of the plurality of control points, includes a point where two squares, of the plurality of squares, having a first tonal contrast, respectively, and two squares, of the plurality of squares, having a second tonal contrast, respectively, share a common border,
the first tonal contrast being lighter than the second tonal contrast; and
where a boundary point, of the plurality of boundary points, includes a point along an edge of the checkerboard pattern.

16. The method of claim 14, where applying the cross derivative filter to the image includes:
determining an orientation of the calibration pattern; and
determining the first coordinate plane based on the orientation of the calibration pattern.

17. The method of claim 14, where at least one of the first filter or the second filter includes at least one of:
an x-derivative of a Gaussian function;
a y-derivative of a Gaussian function; or
a linear combination of an x-derivative and a y-derivative.

18. The method of claim 14, where determining the second plurality of response peaks includes:
determining a first derivative of the image with respect to an x-axis,
the x-axis being associated with a coordinate associated with the first coordinate plane;
determining a second derivative of the image with respect to a y-axis,
the y-axis being associated with another coordinate associated with the first coordinate plane, and
the y-axis being perpendicular to the x-axis;
determining a linear combination of the first derivative and the second derivative based on the second coordinate plane and the third coordinate plane; and
determining the second plurality of response peaks based on the linear combination of the first derivative and the second derivative.

19. The method of claim 14, further comprising:
  determining a camera projection matrix based on the plurality of control points; and
  calibrating a camera based on the camera projection matrix.

20. The method of claim 19, where the camera projection matrix is represented as one or more of:
  a series of transformations,
    where the series of transformation includes a matrix of parameters associated with the camera,
  a rotation matrix, or
  a translation vector.

\* \* \* \* \*